US012794294B2

(12) United States Patent
Koch

(10) Patent No.: US 12,794,294 B2
(45) Date of Patent: Nov. 10, 2026

(54) ROTOR FOR AN EXTERNAL ROTOR MOTOR AND METHOD OF MANUFACTURING A ROTOR FOR AN EXTERNAL ROTOR MOTOR

(71) Applicant: BorgWarner Inc., Auburn Hills, MI (US)

(72) Inventor: Silvio Koch, Kirchheimbolanden (DE)

(73) Assignee: BorgWarner Inc., Auburn Hills, MI (US)

(*) Notice: Subject to any disclaimer, the term of this patent is extended or adjusted under 35 U.S.C. 154(b) by 239 days.

(21) Appl. No.: 18/768,041

(22) Filed: Jul. 10, 2024

(65) Prior Publication Data

US 2025/0030290 A1 Jan. 23, 2025

(30) Foreign Application Priority Data

Jul. 21, 2023 (DE) ......................... 102023119409.7

(51) Int. Cl.

| | |
|---|---|
| ***H02K 1/30*** | (2006.01) |
| ***H02K 1/27*** | (2022.01) |
| ***H02K 1/2791*** | (2022.01) |
| ***H02K 15/03*** | (2006.01) |
| ***H02K 15/165*** | (2025.01) |

(52) U.S. Cl.

CPC ............ *H02K 1/30* (2013.01); *H02K 1/2791* (2022.01); *H02K 15/03* (2013.01); *H02K 15/165* (2013.01)

(58) Field of Classification Search

CPC ........ H02K 1/30; H02K 1/2791; H02K 15/03; H02K 15/165; H02K 1/28

See application file for complete search history.

(56) References Cited

U.S. PATENT DOCUMENTS

| | | | | |
|---|---|---|---|---|
| 7,109,627 | B2 | 9/2006 | Welke et al. | |
| 8,946,969 | B2 | 2/2015 | Dölz | |
| 9,140,125 | B2 | 9/2015 | Ivakitch et al. | |
| 2021/0351647 | A1* | 11/2021 | Luo .......................... | H02K 1/28 |
| 2022/0006341 | A1* | 1/2022 | Takemoto ............ | H02K 1/2791 |

FOREIGN PATENT DOCUMENTS

| | | | |
|---|---|---|---|
| DE | 10358456 | A1 | 7/2005 |
| DE | 102010051264 | A1 | 5/2012 |
| DE | 102019202566 | A | 8/2020 |
| EP | 2592729 | B1 | 5/2018 |
| EP | 3479459 | B1 | 9/2022 |

OTHER PUBLICATIONS

DE Office Action for DE Application No. 102023119409.7 dated Aug. 26, 2025, (8 pages).

* cited by examiner

*Primary Examiner* — Thomas Truong

(74) *Attorney, Agent, or Firm* — Reising Ethington P.C.

(57) ABSTRACT

A rotor for an external rotor motor is described, with an annular stack of sheets made of steel, permanent magnets which are fastened to an inner side of the stack of sheets, and a carrier which has a hub for a shaft and is fastened to the stack of sheets. Brackets are arranged on an outer side of the stack of sheets and press the stack of sheets against the carrier in the axial direction. In addition, a method for manufacturing a rotor for an external rotor motor is disclosed.

5 Claims, 2 Drawing Sheets

ROTOR FOR AN EXTERNAL ROTOR MOTOR AND METHOD OF MANUFACTURING A ROTOR FOR AN EXTERNAL ROTOR MOTOR

CROSS REFERENCE TO RELATED APPLICATIONS

This application claims the priority to German Patent Application No. DE102023119409.7 filed on Jul. 21, 2023, and the entire content of this priority application is incorporated herein by reference in its entirety.

TECHNICAL FIELD

The disclosure relates to a rotor for an external rotor motor and a method for manufacturing a rotor of an external rotor motor.

BACKGROUND

Such rotors comprise a ring-shaped stack of sheets of steel, permanent magnets attached to the inside of the stack, and a carrier that has a hub for a shaft and is attached to the stack. The stack must be attached to the carrier.

An object of at least some implementations of the present disclosure is to show a way in which the carrier of a rotor for an external rotor motor can be attached to a stack of sheet metal at low cost.

SUMMARY

In a rotor, the stack may be pressed against the carrier in an axial direction by brackets that rest against an outer side of the stack. These brackets may be designed as clamps, for example, and enable reliable fastening of the stack to the carrier.

An advantageous refinement of the disclosure provides that the brackets each comprise two sheet metal strips, each of which has an angled end section, lie next to each other on the outside of the stack and are welded to each other and/or to the stack. In this way, the brackets can be designed very cost-effectively. The axial length of the stack may be varied within wide limits according to performance requirements and the same sheet metal strips can still be used to form the brackets. Since each sheet metal strip only has a single angled end section, the sheet metal strip in question does not need to extend over the entire axial length of the stack. One of the two metal strips of each pair of metal strips extends from the carrier to beyond the center of the stack and the other metal strip of this pair extends from the end of the stack facing away from the carrier to beyond the center of the stack of metal sheets.

By welding the sheet metal strips of a pair of sheet metal strips to each other and/or to the stack while the stack is pressed against the carrier in the axial direction, it can be achieved that the stack is later constantly pressed against the carrier by the brackets with a preload, which may be if the welding only extends over part of the axial length of the stack, for example over one tenth to one third of the axial length of the stack.

A further advantageous refinement of the disclosure provides that the sheet metal strips of a pair of sheet metal strips may be arranged at a distance from one another on the outside of the stack of sheets and these two sheet metal strips are welded together by means of a weld seam that bridges the distance between the two sheet metal strips. Advantageously, sheets of the stack may thereby also be welded together, which increases the mechanical stability of the rotor.

Another advantageous refinement of the disclosure is that the stack of sheets has radial protrusions on its outside and the brackets are arranged on these protrusions. The welding melts the material of the stack locally and generally changes the microstructure of the material there, which can impair its soft magnetic properties. The steel of the stack of sheets is usually electrical steel, i.e. soft magnetic steel, such as silicon steel. As the welding takes place in a radial protrusion on the outside of the stack of sheets, the influence of any changes in the magnetic properties of the material on the back ring formed by the stack of sheets remains negligible.

Radial protrusions on the outside of the stack may also be used to create a shaft-hub connection between the stack of sheets and the carrier, for example by the carrier having slots into which the protrusions of the stack engage. In this way, a connection can be created that can absorb both axial forces and torques.

BRIEF DESCRIPTION OF THE DRAWINGS

Further details and advantages of the disclosure are provided in embodiments of the disclosure with reference to the accompanying drawings. Identical and corresponding components are provided with corresponding reference numerals in the various drawings.

DETAILED DESCRIPTION

Figure 1:
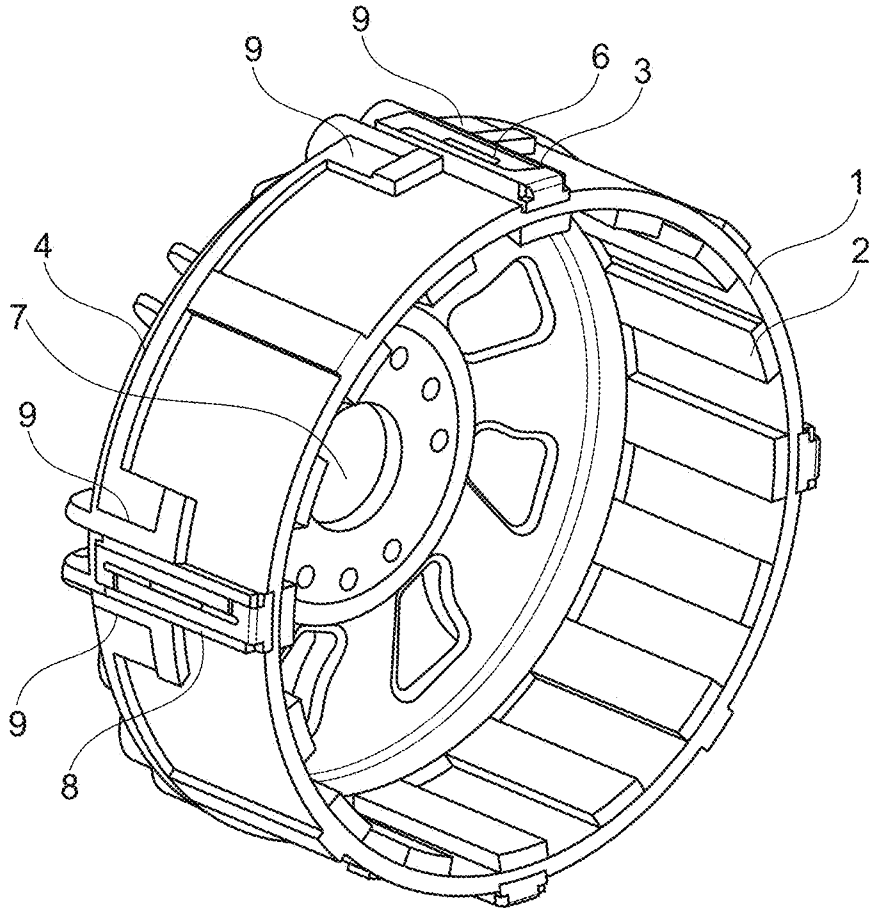
FIG. 1 shows an example of a rotor for an external rotor motor.

FIG. 1 shows a rotor of an electric motor, more precisely of an external rotor motor. The rotor has a ring-shaped stack of sheets 1 made of ferromagnetic steel, for example of electrical steel or other soft magnetic steel. The individual sheets of the stack of sheets 1 may be ring-shaped sheets or may each form only a ring segment. Permanent magnets 2, for example based on $Nd_2Fe_{14}B$, are attached to the inside of the stack 1. The permanent magnets 2 may, for example, be arranged in grooves in the stack 1 and fixed there using adhesive. The stack of sheets 1 is attached to a carrier 4 with brackets 3, which has a hub 7 for a shaft.

Figure 2:
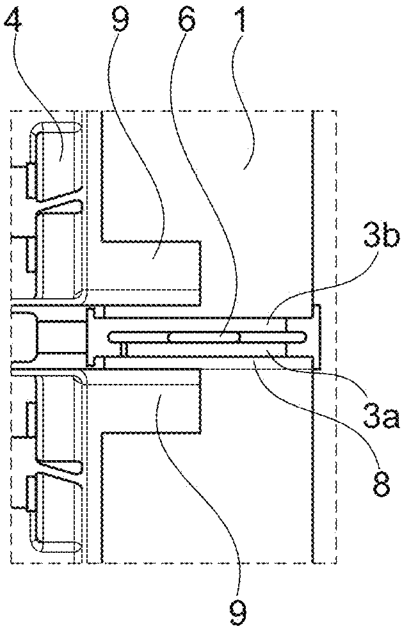
FIG. 2 shows a schematic detailed view of the outside of the rotor in FIG. 1.
Figure 3:
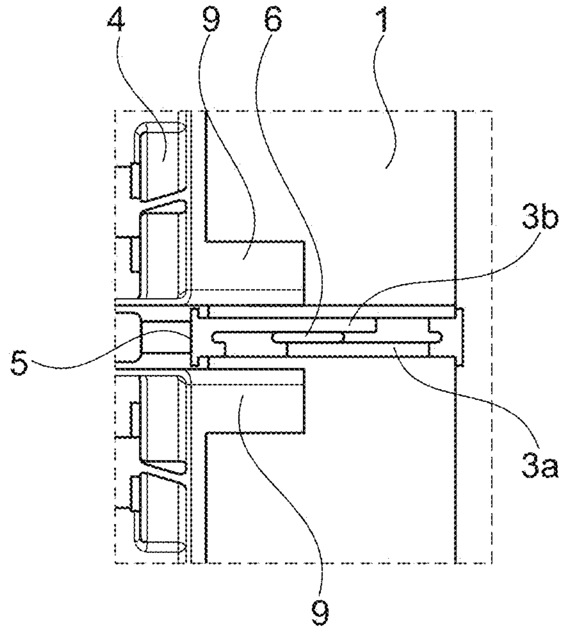
FIG. 3 shows a schematic detailed view of the outside of the rotor of a further embodiment.

The brackets 3 lie on an outer side of the stack of sheets 1 and press it in an axial direction against the carrier 4, in the embodiment shown into the carrier. The brackets 3 are each formed from two sheet metal strips 3*a*, 3*b*, each of which has an angled end section 5, lie next to each other on the outside of the stack of sheets 1 and are welded to each other and to the stack of sheets 1. As FIGS. 2 and 3 show, such brackets 3 may be used advantageously for stacks 1 of different lengths. A shorter stack of sheets 1 is shown in FIG. 2 and a longer stack of sheets 1 in FIG. 3. The longer the stack of sheets 1 is, the shorter the section of the stack of sheets on which both sheet metal strips 3*a*, 3*b*, which form the bracket 3, rest.

Between two sheet metal strips 3*a*, 3*b*, which together form a bracket 3, there is a gap in which there is a weld seam 6, which connects the two sheet metal strips 3*a*, 3*b* to each other and to the stack of sheets 1. One of the two sheet metal strips 3*a* of a pair of sheet metal strips forming a bracket 3 grips with its angled end section 5 around one end of the stack of sheet metal 1, the other sheet metal strip 3*b* of this pair of sheet metal strips grips around the carrier 4 at the other end of the stack of sheet metal strips 1. As FIGS. 2 and 3 show, the angled end section 5 of the sheet metal strip 3*a* rests on one end face of the stack of sheets 1 at one end of the rotor and the angled end section 5 of the other sheet metal strip 3*b* of the pair of sheet metal strips, which forms a bracket 3, rests on the other end of the rotor on an outer surface of the carrier 4 extending in the radial direction.

The sheet metal strips 3*a*, 3*b* each have an increased width at their angled end section 5. In the embodiments shown, the width of the end sections 5 is at least as large as the width of the bracket 3 at its widest point on the radially outer side of the stack of sheets 1. In the embodiment shown, the end sections 5 have a width that is more than twice as large as the adjacent sections of the sheet metal strips 3*a*, 3*b*. The sheet metal strips 3*a*, 3*b* of the sheet metal strip pairs that form the brackets 3 are identical in design, i.e. they are identical within the scope of their manufacturing tolerances.

The stack of sheets 1 may have radial protrusions 8 on its outside. In the embodiment shown, the brackets 3 are arranged on these protrusions 8, each of which extends over the entire axial length of the stack of sheets 1. The protrusions 8 are seated in slots of the carrier 4, which are formed between axial protrusions 9 of the carrier 4 in the embodiment shown. The axial protrusions 9 only extend over part of the axial length of the stack of sheets 1, for example over approximately 20% to 50% of the axial length of the stack of sheets 1.

The slots defined by the axial protrusions 9 of the carrier 3 together with the radial protrusions 8 of the stack of sheets 1, which carrier the brackets 3, form a shaft-hub connection.

The rotor design described above thus creates a connection that can both transmit torques and withstand axial forces.

The steel sheets from which the stack of sheets 1 is made are cut, e.g. by punching, from ferromagnetic sheet steel, for example electrical steel or other soft magnetic steel. Suitable materials include silicon steel. The ring-shaped steel sheets are then stacked to form a stack of sheets 1, which is later connected to the carrier 4. The sheets of the stack of sheets 1 can be joined together by means of one or more weld seams before the stack of sheets 1 is joined to the carrier 4. After such pre-assembly, the stack of sheets 1 is easier to handle.

The stack of sheets 1 is then pressed into the carrier 4 in the axial direction and pairs of sheet metal strips 3*a*, 3*b* are placed on the outside of the stack of sheets 1 and welded to each other and to the stack of sheets 1. The permanent magnets 2 may then be glued into grooves on the inside of the stack of sheets 1, for example.

The carrier 4 can be made of non-magnetic material, for example from an aluminum-based alloy, such as a cast part. The carrier 4 can surround the stack of sheets on its circumference, for example by means of axial protrusions 9. In this way, the stack of sheets 1 can be positioned precisely and imbalance can be largely avoided. The carrier 4 can have a circumferential slot into which the ring-shaped stack of sheets 1 is fitted.

Figure 4:
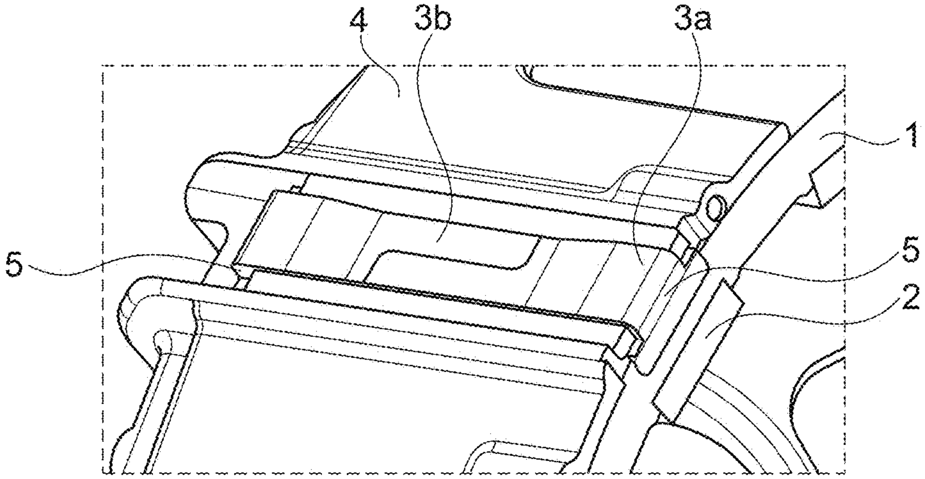
FIG. 4 shows a detailed view of a further design example before welding.

FIG. 4 shows a detailed view of a further embodiment of a rotor. This embodiment differs from the embodiments described above only in the design of the brackets 3. As in the embodiments described above, the bracket 3 is formed by a pair of sheet metal strips 3*a*, 3*b*, each of which has an angled end section 5. The pair of sheet metal strips is shown in FIG. 4 before it is welded. A gap can therefore be seen between narrow sections of sheet metal strips 3*a*, 3*b* that are adjacent to each other, or a dividing line 10 can be seen in the case of sheet metal strips 3*a*, 3*b* that are in contact with each other.

Figure 5:
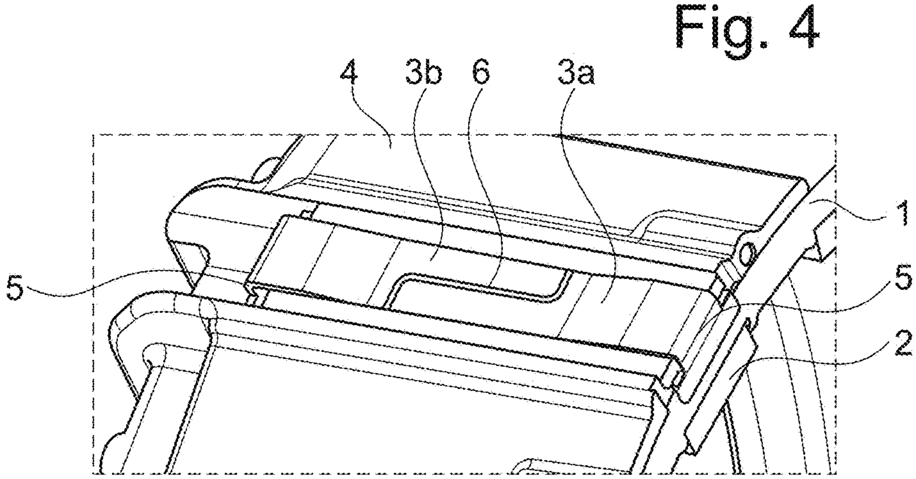
FIG. 5 shows the detailed view of FIG. 4 with laser welding.

To produce the bracket 3, the sheet metal strips 3*a*, 3*b* are then welded together while the stack of sheets 1 is pressed against the carrier 4. In FIG. 4, the two sheet metal strips 3*a*, 3*b* are joined by laser welding, in FIG. 5 by tungsten inert gas welding. Both FIG. 5 and FIG. 6 show the weld seam 6, which joins the two sheet metal strips 3*a*, 3*b* of the bracket 3 together.

Figure 6:
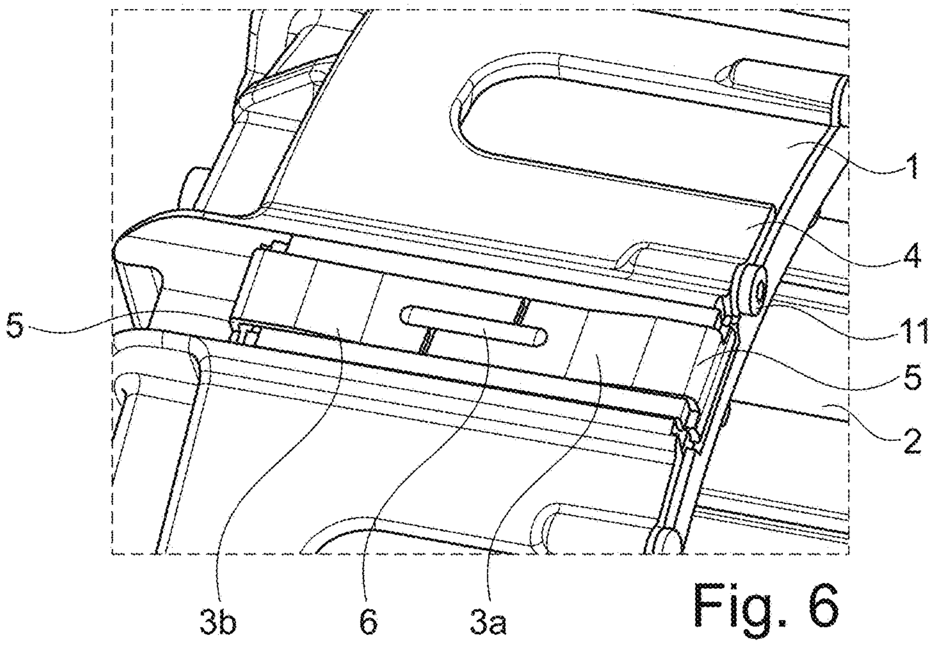
FIG. 6 shows a detailed view of a further embodiment with tungsten inert gas welding.

The embodiment shown in FIG. 6 also differs from the other embodiments by a locking ring 10, which is attached to the end of the stack of sheets 1 facing away from the carrier 4, for example by means of screws 11. The locking ring 10 forms a stop for the permanent magnets 2 arranged in grooves of the stack of sheets 1 and thus secures them against axial movement.

The invention claimed is:

1. A rotor for an external rotor motor, comprising a ring-shaped stack of steel sheets, permanent magnets fixed to an inner side of the stack of sheets, and a carrier, which has a hub for a shaft and is fastened to the stack of sheets, wherein brackets are arranged on an outer side of the stack of sheets and press the stack of sheets against the carrier in the axial direction, and wherein the brackets are each formed from two sheet metal strips which each have an angled end section, lie next to one another on the outer side of the stack of sheets and are welded to one another and/or to the stack of sheets.

2. The rotor according to claim 1, wherein the carrier has slots in which the radial protrusions of the stack of sheets engage.

3. The rotor according to claim 1, wherein the stack of sheets has grooves in which the permanent magnets are seated.

4. A rotor for an external rotor motor, comprising a ring-shaped stack of steel sheets, permanent magnets fixed to an inner side of the stack of sheets, and a carrier, which has a hub for a shaft and is fastened to the stack of sheets, wherein brackets are arranged on an outer side of the stack of sheets and press the stack of sheets against the carrier in the axial direction, and wherein the stack of sheets has radial protrusions on its outer side and the brackets are arranged on these protrusions.

5. A rotor for an external rotor motor, comprising a ring-shaped stack of steel sheets, permanent magnets fixed to an inner side of the stack of sheets, and a carrier, which has a hub for a shaft and is fastened to the stack of sheets, wherein brackets are arranged on an outer side of the stack of sheets and press the stack of sheets against the carrier in the axial direction, and wherein the carrier surrounds the stack of sheets only over part of the axial length of the stack of sheets.

* * * * *